United States Patent Office 3,044,876
Patented July 17, 1962

3,044,876
TREATMENT OF MUSTARD SEED
Kenneth J. Goering, Bozeman, Mont., assignor to Oil Seed Products, Inc., Lethbridge, Alberta, Canada, a corporation of Montana
No Drawing. Filed Apr. 19, 1960, Ser. No. 23,128
4 Claims. (Cl. 99—2)

This invention relates to the treatment of mustard seed. More particularly it relates to the treatment of mustard seed meal whereby the meal produced after separation of the mustard oil from the mustard seed is converted from an unpalatable and inedible product to one which is both platable and edible, concurrently with the production of a useful by-product, which may be either sinigrin, or allyl isothiocyanate, depending on the procedure followed.

In my earlier filed copending applications Serial Nos. 741,149 and 788,676, filed June 10, 1958, now abandoned, and January 23, 1959, now United States Patent 2,987,399, respectively, I have described the treatment of seeds of the mustard family (Cruciferae) and particularly seeds of the species (Brassica) such as mustard seed, which treatments include: separation of the vegetable oil from the seed by any method which does not destroy the naturally occurring enzymes in the seed; hydrolysis of the glucosides present in the seed by action of the enzymes originally present in the seed or added to the seed; steam distillation of the hydrolyzed mixture; and separation of the liquids from the solids remaining after steam distillation.

While the process described in the aforesaid applications produces a meal which is platable and which is free from sinigrin, the procedure suffers from certain operational disadvantages. For example, it requires a substantial investment in distillation equipment because of the viscous nature of the mustard meal-water mixture from which the liberated volatile oil must be removed by distillation.

This and other disadvantages inherent in my earlier described processes are avoided by the seed treatment constituting the present invention which includes the following steps:

(1) Separation of the vegetable oil from the seed by any suitable method;
(2) Water extraction of the residual meal at or near boiling point;
(3) Separation of liquid from solids after water extraction—(recovered solids are the animal feed products);
(4) Treatment of the liquid to recover either sinigrin or allyl isothiocyanate depending on the procedure selected.

Mustard seed meal is not palatable to livestock because of the presence of a water soluble glucoside, sinigrin, which is enzymatically decomposed by the enzyme myrosin which is also present in the mustard seed meal. When decomposed by the enzyme myrosinase, the thioglucoside sinigrin yields as one decomposition product—allyl isothiocyanate which is both unpalatable and toxic even when present in only minute or trace amounts. Sinigrin must be completely removed from mustard seed meal because myrosinase is present in the intestinal tracts of animals. Animals instinctively refuse to eat meal containing allyl isothiocyanate in trace amounts and it is one object of this invention to produce a meal free from sinigrin and free from decomposition products of sinigrin.

Another object of the invention is to recover sinigrin in substantially pure form.

Still another object of the invention is to recover allyl isothiocyanate by an improved procedure.

These and other objects will become apparent from the description which follows in which there are given by way of example several methods for achieving the stated objects.

Example 1

Mustard seed was crushed between conventional flaking or corrugated rollers and the resulting seed meal was extracted with a solvent for the mustard seed oil. The oil is a vegetable oil with nutritive value and procedures for producing solvent extracted mustard seed meal and mustard seed oil are well known and form no part of the present invention.

Five parts by weight of solvent extracted meal was slowly added with agitation to twenty-five parts by weight of water at 85° C. The mixture of water and meal was stirred gently for about sixty minutes at the end of which interval it was filtered. The solid residue was washed with five parts by weight of hot water for five successive washings. After the washings, the solids were dried and the dried product was found to be a suitable sinigrin-free animal feed. The filtrate containing the twenty-five parts by weight of extraction water and the twenty-five parts by weight of wash water (five times five parts of wash water) was passed through a column containing five parts by weight of Amberlite IR–4B anion exchange resin in the chloride form. The fifty parts by weight of aqueous extract was passed through the column followed by a little wash water.

The resin in the ion-exchange column was then eluted with 0.2 N KOH until the elute was basic. About ten parts by weight of 1% KOH was required (0.2 N KOH is about 1% KOH).

The eluted solution then contains the sinigrin and a very small amount of KOH. Most of the potassium hydroxide was used to convert the sinigrin to the potassium salt and thus liberate it from the column. This results in a five-fold concentration and in the elimination of nearly all the impurities. This solution was dried and the sinigrin was recovered as such.

Proceeding in this fashion about 20 mg. of sinigrin was recovered for each gram of solvent-extracted mustard seed meal being processed.

Example 2

The process of Exxample 1 was repeated except that the eluted solution was treated with fresh crushed mustard seed. The resulting mixture was held at 50° C. for one hour to complete hydrolysis of the sinigrin and then steam distilled. The volatile oil was condensed from the vapors. The volatile oil was decanted from the balance of the condensate. When following this procedure, for each gram of solvent-extracted mustard seed meal, about 5 milligrams of allyl isothiocyanate were recovered.

Example 3

Solvent-extracted mustard seed meal was added slowly to hot (80° C.) water as before, with agitation. The effect of extraction time was investigated with the following results:

| Extraction time (minutes) | Percent sinigrin left in residue |
|---|---|
| 20 | 5.8 |
| 40 | 0 |
| 60 | 0 |
| 120 | 0 |

From this it will be seen that the extraction of sinigrin from the seed meal may be completed in about one-half hour or slightly longer, using hot water as the extractant.

Example 4

The solvent extracted meal was added to heated water as before, and after extracting the sinigrin, the solids and liquids were separated by either centrifuging or filtration. The solids were again sent to a dryer to be dried to form a suitable animal feed. To the separated liquid there was added 0.1% of ground fresh mustard seed based on the weight of the meal.

The liquid was held at 50° C. for one hour while the liquid and fresh seed were agitated, after which the liquid and seed mixture was heated to boiling and then steam distilled for thirty minutes. The condensed vapors were collected in a vessel and the bottom layer containing allyl isothiocyanate was decanted from the aqueous layer above it.

The invention has been described with reference to the treatment of mustard seed as a preferred example. It should be understood that the invention is applicable to other seeds of the genus Cruciferae. However, it is particularly applicable to the seeds of Montana brown and Oriental yellow mustards as such seeds are particularly rich in sinigrin. The following table sets forth the content of "volatile oil" calculated as allyl isothiocyanate recovered from solvent extracted seed meals.

| Source of meal: | Percent volatile oil |
| --- | --- |
| Montana brown mustard seed (1) | 0.220 |
| Montana brown mustard seed (2) | .285 |
| Montana yellow mustard seed special | .150 |
| Oriental yellow mustard seed (1) | .285 |
| Oriental yellow mustard seed (2) | .295 |
| Oriental yellow mustard seed (3) | .312 |
| Oriental yellow mustard seed (4) | .379 |
| Oriental yellow mustard seed (5) | .346 |
| Polish rape seed | .024 |
| Golden rape seed | .053 |

What is claimed as new is as follows:

1. A process for separately recovering sinigrin and sinigrin-free mustard seed meal from mustard seed which comprises: crushing the mustard seed; separating the mustard oil from the crushed seed; extracting the resulting seed with water at a temperature between 80° C. and 85° C. for about one half hour; separating the liquid and solid phases present after said extraction; drying the separated solids to produce an animal feed and recovering from the separated liquid, at least one compound selected from the group consisting of sinigrin and decomposition products of sinigrin.

2. A process for separately recovering sinigrin and sinigrin-free mustard seed meal from mustard seed which comprises: crushing the mustard seed; solvent extracting the mustard oil from the crushed seed; extracting the resulting solvent-extracted seed with water at a temperature between 80° C. and 85° C. for about one half hour; separating the liquid and solid phases present after said extraction; drying the separated solids to produce an animal feed passing the separated liquid through an ion exchange resin to separate the sinigrin from said liquid, and eluting the sinigrin from said ion exchange resin.

3. A process for separately recovering sinigrin and sinigrin-free mustard seed meal from mustard seed which comprises: crushing the mustard seed; solvent extracting the mustard oil from the crushed seed; extracting the resulting solvent extracted seed with water at a temperature between 80° C. and 85° C. for about one half hour; separating the liquid and solid phases present after said extraction; drying the separated solids to produce an animal feed; adding a small amount of fresh crushed mustard seed to the separated liquid; hydrolyzing the sinigrin in said liquid by maintaining the liquid seed mixture at about 50° C.; and recovering allyl isothiocyanate by steam distillation of the hydrolyzed mixture.

4. A process for separately recovering sinigrin and sinigrin-free mustard seed meal from mustard seed which comprises: crushing the mustard seed; separating the mustard oil from the crushed seed; extracting the resulting seed with water for about one half hour at about 80° C.; separating the liquid and solid phases present after said extraction; drying the separated solids to produce an animal feed and recovering the sinigrin from the separated liquid.

References Cited in the file of this patent

FOREIGN PATENTS

| 224,524 | Great Britain | Aug. 27, 1925 |
| 690,597 | Great Britain | Apr. 22, 1953 |